INVENTOR
DANIEL CHARLES
By Haseltine, Lake & Co.
AGENTS

Patented July 3, 1951

UNITED STATES PATENT OFFICE 2,559,279

MANUFACTURE OF ELECTROLUMINESCENT SCREENS

Daniel Charles, Paris, France, assignor to Compagnie Generale de T. S. F., a corporation of France Application February 27, 1948, Serial No. 11,672
In France March 27, 1947

2 Claims. (Cl. 117—33.5)

The present invention relates to luminescent screens in cathode ray tubes and to their manufacture.

In apparatus utilizing an electroluminescent screen transforming the electronic or ionic energy into visible or invisible luminous vibrations it is important that the layer on which the conversion is produced fulfils a certain number of conditions. The latter are all the more numerous and difficult to meet the more intense and accelerated the incident beam is found to be. This is particularly so in the case of oscillographs of high power and high accelerating tension such as are used in projection, in television.

In the first place the screen must be mechanically sturdy so that the electroluminescent particles are not detached and shall not in being deposited on the diaphragms of the electronic optics, start dangerous discharges or falsify their operation; this is particularly so in the case of the electronic microscope. The screen must be sufficiently conductive for its potential to be well defined, otherwise deformations of the images are to be feared on account of the accumulation of charges deposited by the beam. The secondary emission must be well defined and next to 1, so that the screen remain practically at the potential of the last accelerating electrode. Finally the electrode and its support must be able to evacuate thermally the frequently high power (up to 500 watts) conveyed by the beam.

The present invention concerns the process of manufacturing of an electroluminescent screen satisfying the above enumerated conditions, which aim can not be attained with any form of the conventional screen, in which the electroluminescent substance was fixed on the glass by means of a chemical binder. In the case of the present invention the electroluminescent substance is pressed in a conductive support which is mechanically sturdy and may be fixed to the interior of a tight envelope or be integral with the latter. This permits one to establish a solid setting of the luminescent substance on its support and to eliminate from the interior of the tube any undesirable residue which the formerly used chemical binder frequently introduced. Moreover, as the support is a conductor the potential of the screen is well defined and good heat evacuation of the power conveyed by the incident beam is insured.

The invention will be better understood by means of the annexed figures which show by way of nonlimiting example one mode of embodiment.

Figure 1:
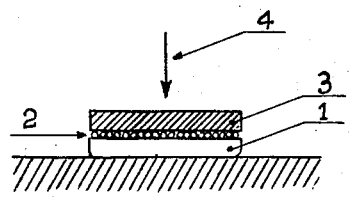

In Fig. 1 the electroluminescent substance 2 in the form of a crystalline powder is applied uniformly and in a thin layer to a supporting plate 1 which is made of a metal which is a good conductor of electricity and of heat and which is less hard than the luminescent substance and does not act on it chemically, said plate being given a shape insuring its mechanical rigidity. By way of nonlimiting example, it may be made of aluminum.

The electroluminescent grains are then driven in this support, which is kept at a normal temperature, by the action of pressure 4 exerted on a superposed plate 3 which is of great hardness relative to that of the substance 2 which it covers. The assembly 1, 2 and 3 is subjected to the action of a press appropriately controlled.

Figure 2:
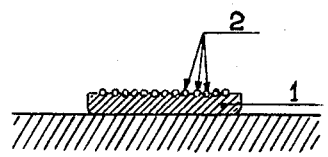

Fig. 2 shows the finished screen in section, the electroluminescent grains 2 being encased in the conducting support 1.

The pressure has no effect on the luminescence of such sturdy materials as the orthosilicates. In the case of more fragile substances such as the sulfides the finished screen is annealed, thus totally restoring the luminosity, which can readily be done on account of the structure of the latter.

The invention is not limited to plane supports but extends to any appropriate form of screen capable of conferring a directive effect to the luminous vibrations.

The screens produced according to the invention offer the advantage of being readily handled in the course of their being mounted and dismounted.

I claim:

1. Process of manufacturing an electro-luminescent screen, comprising the following steps: spraying uniformly directly on the surface of a soft metal support plate of aluminum, a thin layer of crystals of a luminescent substance whose hardness is greater than that of the substance of said plate, applying on said layer a pressing plate of a substance of greater hardness with respect to said crystals, and applying at normal temperature a pressure on said pressing plate thereby distributing uniformly and simultaneously the pressure over all said layer, and thereby forcibly embedding said crystals in the support plate.

2. An electro-luminescent screen adapted for use in a cathode ray oscillograph comprising a rigid metallic plate of aluminum and a thin layer uniformly distributed thereon of crystals of a luminescent substance, of which the hardness is greater than that of said plate, said crystals having been forcibly embedded in said plate.

DANIEL CHARLES.

REFERENCES CITED

The following references are of record in the file of this patent:

UNITED STATES PATENTS

| Number | Name | Date |
|---|---|---|
| 261,198 | Barton | July 18, 1882 |
| 274,415 | Trotter | Mar. 20, 1883 |
| 1,088,734 | Shroers | Mar. 3, 1914 |
| 2,072,115 | Leverenz | Mar. 2, 1937 |
| 2,103,085 | McKeag et al. | Dec. 21, 1937 |
| 2,307,474 | Thompson | Jan. 5, 1943 |